Patented Feb. 19, 1935

1,991,752

UNITED STATES PATENT OFFICE 1,991,752

WATERPROOFING AND POLISHING COMPOUND FOR WOOD

Harvey G. Kittredge, Dayton, Ohio, assignor to The Kay & Ess Chemical Corporation, Dayton, Ohio, a corporation of Delaware No Drawing. Original application June 15, 1932, Serial No. 617,471. Divided and this application August 31, 1933, Serial No. 687,725

11 Claims. (Cl. 91—68)

My invention relates to a new article of manufacture for use as a waterproofing and polishing compound for wood, to the method of manufacture, and to the method of application to the wood.

It is the object of my invention to provide a waterproofing compound capable of taking a high polish that is not affected by such materials as acetone, which gives a high lustre finish to the wood treated and impregnates the wood to render it waterproof.

It is a further object to provide such a compound which is particularly adaptable to shoe lasts, shoe heels and the like, which is capable of not only taking a high polish but, upon becoming dull, to be repolished by additional buffing.

It is a further object to provide such a compound in combination with wood as to form an extremely smooth surface so that the last and shoe can be parted without the necessity of chalking the last and without the necessity of heel stripping, thereby effecting a very material economy in the production of shoes.

It is my object to provide a compound which will not be affected by the acetone in the cellastic backing employed in connection with the building of shoes on wooden shoe lasts.

In particular, it is my object to provide a compound comprising varnish and wax applied to the wood to be treated simultaneously, the compound being allowed to penetrate the wood and become an integral part thereof. The result is a waterproof piece of wood which can be repeatedly buffed and repolished, which has a finish that is very smooth and very hard and which resists the action of such solvents as acetone.

My invention comprises a mixture of a varnish, such as spar varnish, for example, and a wax, such as paraffin wax, for example.

While not essential to my invention, yet I find that the application and subsequent use of the compound on wood is facilitated by combining the spar varnish with penetrating oil, such as China-wood oil, a thinner and a drier.

A typical mixture which I have found to have highly satisfactory results in practice with shoe lasts is the following. I select a spar varnish made as follows: I melt 50 pounds of rosin ester, which is a combination of rosin and glycerin, in 28 gallons of raw China-wood oil. I melt the mixture until the temperature reaches 400° Fahrenheit and I then add 3½ pounds of litharge runing the temperature up to 560-570° Fahrenheit. I then add immediately 50 pounds more of the rosin ester stirring until melted which will bring down the temperature to about 550° Fahrenheit. I then add ½ pound of precipitated cobalt linoleate. I then cool the mixture to 440-450° Fahrenheit. Thereafter, I add 60 gallons of petroleum naphtha. This completes the spar varnish.

It will be understood that various types of varnish can be employed, but I prefer a spar varnish of this compound.

I mix 10½ gallons of this spar varnish with the following: 4¼ gallons of China-wood oil which has been heated to 400° Fahrenheit for about 3½ hours; 40 gallons of petroleum naphtha or coal tar penetrating agent and thinners; 5 gallons of gum turpentine or wood turpentine or any equivalent pine oil having similar characteristics; ½ gallon of manganese drier made by dissolving 3 pounds of manganese resinate in one gallon of turpentine; ¼ gallon of tri-metal drier comprised of lead linoleate, cobalt linoleate and manganese linoleate with turpentine. The latter tri-metal drier is made up according to the formula of 385 pounds of lead linoleate, 887 pounds of cobalt linoleate, 14 pounds of manganese linoleate and 1202 gallons of turpentine, either gum or wood turpentine.

I then place in approximately a 75-gallon container 45⅜ pounds of paraffin wax and melt it therein; and I then add, while the wax is warm, the above mixture to the extent of 60½ gallons constantly stirring as the material is mixed and kept in melted condition. I then allow it to cool whereupon my compound is in finished condition.

It will be understood that in the place of paraffin wax I may employ beeswax, ceresin wax, czokerite, japan wax, bayberry wax, candelilla, or hard pressed stearic acid. Other equivalent waxes may be employed.

The function of the spar varnish with these constituent gums is to impart a hard waterproof finish, the surface of which is capable of taking a hard polish. The oils employed in the varnish and in the mixture of the waxes with the varnish are for the purpose of carrying the compound into the texture of the wood and to make it water resisting. The thinner also helps to permeate the wood and to cause an even flow over the surface and into the wood. The drier facilitates air drying of the wood after it has been treated as hereinafter described.

The interior waterproofing is carried out by the penetration of the China-wood oil, while the exterior hard polish in combination with the waxes is facilitated by the gums, such as the rosin ester. The wax resists acetone action, facilitates the polishing of the surface, fills the surface pores of the wood and acts as a further waterproofing medium on the surface of the wood.

The process of applying this compound to the wood is as follows: The finished last or heel blocks, made of such woods as maple, which are extremely hard, are dipped in this compound of my invention at room temperature for approximately 20 minutes, or more. It is then drained of the surplus liquid and allowed to dry. After it has air dried for a period of from 12 to 24 hours, room temperature, depending upon current moisture and temperature conditions, it is polished resulting in a natural wood finish revealing the grain of the wood. An ordinary wood last is penetrated a considerable distance below its surface by this compound and, in many instances, is completely saturated throughout with it.

The resulting finish is extremely hard, very smooth and waterproof.

In the manufacture of shoes, the finish is such that the present practice of chalking the lasts is eliminated. The sticking of the acetone, as in the use of cellastic backing, is eliminated as the compound is impervious to acetone action. Heel stripping is also eliminated. These three factors alone constitute a very large saving in the cost of manufacturing shoes.

I particularly call attention to the fact that, by mixing the varnish and wax and applying it to the wood as a single compound, I secure this result.

The proportions mentioned are not exclusive as many other different proportions can be employed, but I have found that the proportions indicated in actual practice are successful and satisfactory proportions. Naturally, such proportions are varied according to the conditions under which the compound is employed and varying conditions of temperature and humidity as well as variations in the natural product, such as the wood being treated.

I comprehend within my invention the practice of expediting the application of this material of my invention by placing the wood in a chamber subjected to a vacuum of approximately 2-4 inches and, when the air has been withdrawn from the wood, I then apply the compound so that it will cover the lasts or other wood articles; and, thereafter, I apply 50-60 pounds of pressure to force the compound into the wood so that it will thoroughly penetrate the wood. Thereafter, the lasts are drained and dried.

It will be understood that when I refer to a last I refer to any article of wood.

It will be further understood that I desire to comprehend within my invention such modifications as may be necessary to adapt it to varying conditions and uses.

This application is a division of my application Ser. No. 617,471 filed June 15, 1932.

Having thus fully described my invention, what I claim as new and desire to secure by Letters Patent, is:

1. A new article of manufacture consisting of a wooden last or heel block of waterproof character impregnated with a compound consisting of a waterproof varnish, a wax, and a drying oil, said drying oil serving as a penetrant for carrying said varnish and a part of the wax into the wood.

2. A new article of manufacture consisting of a wooden last or heel block of waterproof character impregnated with a compound consisting of a waterproof varnish, a wax and a heat bodied drying oil, said heat bodied driyng oil serving as a pentrant for carrying said varnish and a part of the wax into the wood.

3. A new article of manufacture consisting of a wooden last or heel block of waterproof character impregnated with a compound consisting of a waterproof varnish, a wax, and a China-wood oil, said China-wood oil serving as a penetrant for carrying said varnish and a part of the wax into the wood.

4. A new article of manufacture consisting of a wooden last or heel block of waterproof character impregnated with a compound consisting of a waterproof varnish, a wax, a drying oil, and a thinner, said drying oil serving as a penetrant for carrying said varnish and a part of the wax into the wood, the wax remaining on the surface rendering said surface capable of taking a high polish.

5. A new article of manufacture consisting of a wooden last or heel block of waterproof character impregnated with a compound consisting of the following ingredients given in the following proportions: 10½ gals. of spar varnish, 45⅜ lbs. of paraffin wax, and 4¼ gals. China-wood oil, said China-wood oil serving as a penetrant for carrying said varnish and a part of said wax into the wood.

6. In a process of treating wooden lasts and heel blocks, to make them waterproof and immune from the effects of acetone, consisting of exhausting the air from the lasts and heel blocks, treating the shaped lasts and heel blocks to a composition including a waterproof varnish, a wax, and a drying oil, the drying oil being in such quantities as to carry the varnish and a portion of the wax into the wood a distance such that the wood will be impregnated therewith.

7. In a process of treating wooden lasts and heel blocks to make them waterproof and immune from the effects of acetone, consisting of treating the shaped lasts and heel blocks to a composition including a waterproof varnish, a wax, a drying oil, and a thinner, the drying oil and thinner being in such quantities as to carry the varnish and a portion of the wax into the wood a distance such that the wood will be impregnated therewith.

8. In a process of treating wooden lasts and heel blocks to make them waterproof and immune from the effects of acetone, consisting of treating the shaped lasts and heel blocks to a composition including a waterproof varnish, a wax, and a drying oil, the drying oil being in such quantities as to carry the varnish and a portion of the wax into the wood a distance such that the wood will be impregnated therewith.

9. In a process of treating wooden lasts and heel blocks to make them waterproof and immune from the effects of acetone, consisting of exhausting the air from the lasts and heel blocks, immersing the lasts and heel blocks in a composition including a waterproof varnish, a wax, and a drying oil, and applying pressure to the wood and the compound to force the compound into the wood so as to carry the varnish and a portion of the wax into the wood a distance such that the wood will be impregnated therewith.

10. In a process of treating wooden lasts and heel blocks to make them waterproof and immune from the effects of acetone, consisting of exhausting the air from the lasts and heel blocks, immersing the lasts and heel blocks in a composition including a waterproof varnish, a wax, a drying oil, and a thinner, and applying pressure to the wood and the compound to force the compound into the wood so as to carry the varnish and a portion of the wax into the wood a distance such that the wood will be impregnated therewith.

11. In a process of treating wooden lasts and heel blocks to make them waterproof and immune from the effects of acetone, consisting of exhausting the air from the lasts and heel blocks, immersing the lasts and heel blocks in a composition including a waterproof varnish, a wax, and a China-wood oil, and applying pressure to the wood and the compound to force the compound into the wood so as to carry the varnish and a portion of the wax into the wood a distance such that the wood will be impregnated therewith.

HARVEY G. KITTREDGE.